No. 723,027. PATENTED MAR. 17, 1903.
S. RICKERSBERG.
FLY TRAP.
APPLICATION FILED AUG. 13, 1902.
NO MODEL.

Witnesses:
Rudow Rummler
Blanche Michael

Inventor:
Simon Rickersberg
by Rummler & Rummler
his Attorneys.

UNITED STATES PATENT OFFICE.

SIMON RICKERSBERG, OF CHICAGO, ILLINOIS.

FLY-TRAP.

SPECIFICATION forming part of Letters Patent No. 723,027, dated March 17, 1903.

Application filed August 13, 1902. Serial No. 119,467. (No model.)

*To all whom it may concern:*

Be it known that I, SIMON RICKERSBERG, a citizen of the United States of America, and a resident of Chicago, in the county of Cook and State of Illinois, have invented certain new and useful Improvements in Fly-Traps, of which the following is a specification.

The main object of my invention is to provide an improved form of fly-trap having all of the efficiency of sticky fly-paper without occupying a large amount of space and without the disadvantage of being easily blown about by the wind. I accomplish this object by the device shown in the accompanying drawings, in which—

Figure 1:
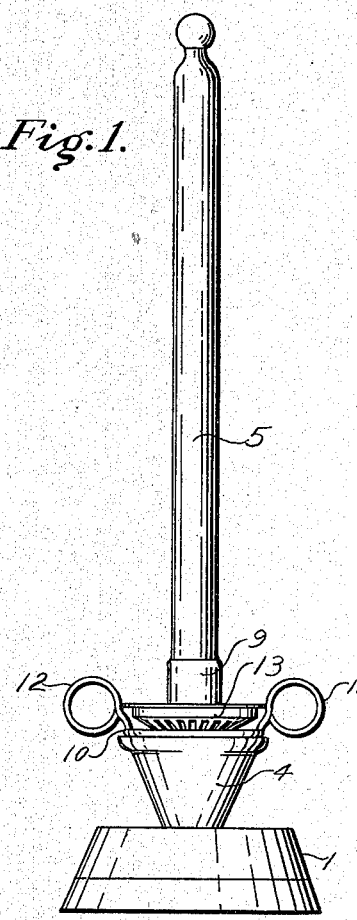
Figure 3:
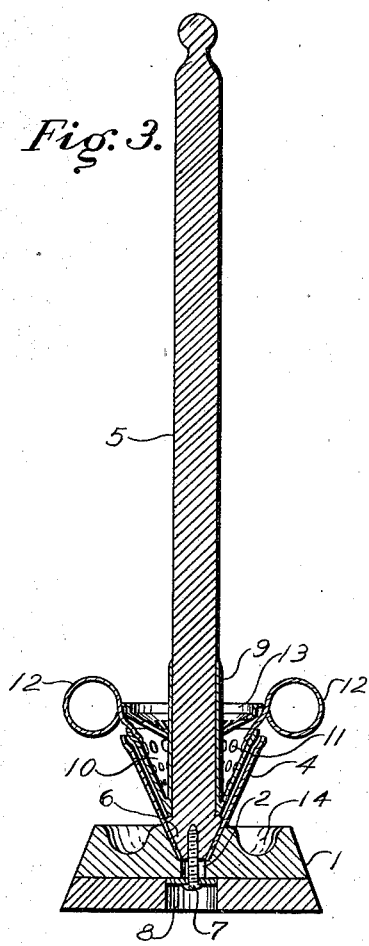
Figure 2:
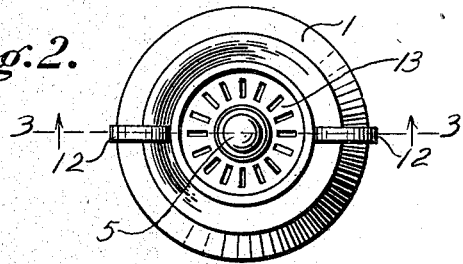

Figure 1 is an elevation of a fly-trap constructed according to my invention. Fig. 2 is a top plan of the same. Fig. 3 is a section on the line 3 3 of Fig. 2.

In the construction shown the base 1 is provided with a central aperture 2. The upper part of the aperture 2 is conical in form and has seated therein a conical receptacle 4. A rod 5, cylindrical in form and having its lower end 6 of suitable shape to fit the interior of the lower part of the conical receptacle 4, is seated within said receptacle in the position shown in the drawings and is securely held in position by means of a screw 7, which bears against a washer 8 in the lower part of the aperture 3 and is screwed into the lower end of the rod 5.

A scraper 9 is slidably mounted on the rod 5 and has secured to its lower end a second conical receptacle or can 10, which is similar in form to the receptacle 4 and is provided with a plurality of perforations 11. The can 10 is provided with two handles 12, by means of which the can 10 and the scraper 9 may be moved along the rod 5. The upper end of the can 10 is closed by means of a perforated tray or strainer 13, which rests loosely at the upper end of the can 10 and is readily removable from same. The base 1 is provided with an annular cavity 14 in its upper side to catch any liquid which may drip from the edges of the receptacle 4.

The operation of the device shown is as follows: A sweet sticky liquid glue, such as is ordinarily used on fly-paper, is poured into the receptacle 4. When the can 10 is now placed in the position shown in the drawings, this liquid will pass through the perforations 11 and into the can 10. If the can 10 is now moved upward along the rod 5, the liquid will run out of the perforations 11, down the inclined walls of the can 10, and spread upon the surface of the rod 5. As the can 10 is again moved downward into its normal position the rod 5 will have become evenly coated with the sticky liquid. Flies or other insects which are attracted by the sweet sticky liquid become entangled therein and stick to the surface of the rod 5, as in the case of fly-paper. If the handles 12 are now moved upwardly along the rod, the scraper 9 will remove the flies from the rod 5 and the flies will fall into the strainer 13. The movement of the can 10 along the rod 5 will simultaneously supply same with a fresh coating of liquid. If the parts are now returned to their normal positions, as shown in Figs. 1 and 3, the viscous liquid will gradually drain from the mixture on the strainer 13 and into the receptacle 4. The strainer may now be removed and the mass of dead insects shaken from same.

It will be seen that with this instrument the liquid may be used a number of times, thus reducing the cost of operation of the device considerably below the cost of fly-paper. Further, the device occupies but little room and cannot be overturned by the wind.

It will be seen that some of the details of the device shown may be altered without departing from the spirit of my invention. I therefore do not confine myself to such details, except as hereinafter limited in the claim.

What I claim as my invention, and desire to secure by Letters Patent, is—

A fly-trap, comprising a base having a conical aperture in its top, a hollow conical receptacle fitting in said aperture and flaring above same, a rod fitting in the lower end of said receptacle and extending above same and secured by fastening means passing through the bottom of said base, a conical perforated can fitting in said receptacle and having a sleeve fitting said rod, and a perforated cover for said member secured below the upper end of said sleeve, said sleeve having a scraping edge above said cover, said can and sleeve being slidable on said rod, substantially as described.

Signed at Chicago this 11th day of August, 1902.

SIMON RICKERSBERG.

Witnesses:
RUDOW RUMMLER,
EUGENE A. RUMMLER.